No. 661,021.  
J. C. PRATT.  
DRIVE CHAIN AND WHEEL THEREFOR.  
(Application filed July 15, 1899.)  
Patented Oct. 30, 1900.
(No Model.)
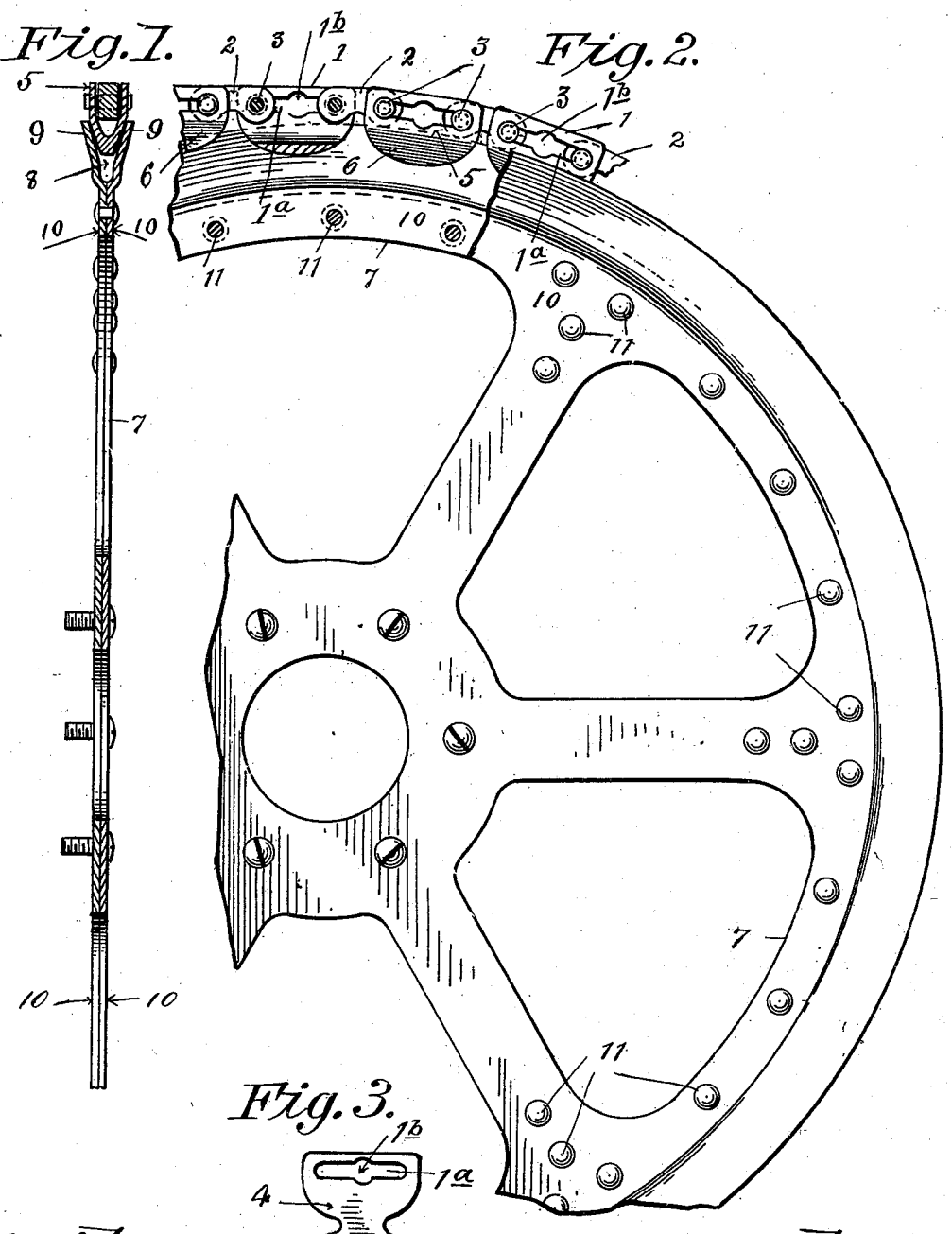

UNITED STATES PATENT OFFICE.

JOHN C. PRATT, OF HARTFORD, CONNECTICUT, ASSIGNOR OF ONE-HALF TO ARTHUR L. FOSTER, OF SAME PLACE.

DRIVE-CHAIN AND WHEEL THEREFOR.

SPECIFICATION forming part of Letters Patent No. 661,021, dated October 30, 1900.

Application filed July 15, 1899. Serial No. 723,891. (No model.)

*To all whom it may concern:*

Be it known that I, JOHN C. PRATT, a citizen of the United States of America, residing at Hartford, in the county of Hartford and State of Connecticut, have invented new and useful Improvements in Drive-Chains and Wheels Therefor, of which the following is a specification.

This invention relates to drive-chains for power transmission, having a frictional engagement with the wheels on which they run, one object of the invention being the construction of a chain adapted to run in a groove on a wheel, the cross-sectional form of which groove substantially conforms to the cross-sectional form of that part of the chain which comes in contact therewith.

A further object of the invention is the construction of the wheel on which the chain runs, whereby the walls of that part of said wheel engaged by the chain are made yielding in a direction inclined to the plane of rotation of the wheel; and the invention consists in the construction of the devices herein described and claimed.

In the drawings forming part of this specification, Figure 1 is a sectional view taken centrally through a wheel and also showing the chain in section. Fig. 2 is a side elevation of a part of a wheel, showing a piece of chain thereon, one of the links of the latter being in section and a part of the wheel being broken away. Fig. 3 is a plan view of a blank from which one of the links of the chain is formed.

Heretofore flexible metal driving connections of the link type between two pulleys or wheels have ordinarily been made of such form as to engage teeth on the periphery of the wheel. This is the common sprocket chain and wheel construction. Under certain conditions the chain will stretch, and there is then liability of the open links of the chain not registering with the said sprocket-teeth, in which case serious injury to the mechanism driven by said chain and to the chain and sprocket may result. To overcome these objections, the chain and wheel forming the subject of this invention are adapted to have a frictional engagement one with the other in place of the positive engagement of the sprocket chain and wheel.

In certain constructions, of which the bicycle is a good illustration, a driving connection of metal is essential to practical utility, as the physical conditions under which it must be used preclude the use of any material affected by heat and moisture or of any material not combining a maximum of strength and a minimum of weight and bulk. Furthermore, great flexibility is another essential on account of the small diameters of wheels over which such a driving connection must run and on account of the fact that driven mechanism must be rotated with a minimum application of power.

A flexible driving-band, like a belt, would overcome the objections to the sprocket-chain; but such a connection, for obvious reasons, would be unsuitable in such conditions as are met with in bicycle constructions. Any driving connection like a metal band is not practicable in such constructions owing to its lack of flexibility and the impossibility of using it on small driving pulleys or wheels.

The construction forming the subject of this application has all of the desirable qualities of the positively-operating sprocket chain and wheel and of the flexible band connection, with none of the disadvantages of either, and insures a positive connection between the drive-chain and its wheel, even though the chain should be slack. The chain is composed of a series of alternate links 1, and connecting-blocks 2, connected one with the other alternately by the pivot-pins 3. The blocks are of the construction common to sprocket-chains. The links are preferably made from a metal blank 4, substantially as shown in Fig. 3, the opposite sides of which are bent one toward the other over a suitable former, whereby the finished link is formed to the shape in cross-section of the link shown in Fig. 1, each side of said link having two planes—viz., the vertical and the inclined. The parts 5 of the blank 4 (see Figs. 1 and 2) along the top of each link, after the latter is folded, are parallel, and the remaining part of each half of said blank is tapered inward at the same angle toward the lower edge of the link, forming the inclined sides 6 thereof. These tapered surfaces only bear on the wheel 7, with which the chain is used. The ends of the blocks 2 lie between the parallel sides of the links 1, and any suitable form of pivotal connection may be used to unite said blocks and links; but that shown in the drawings, in which the links are provided with a slot 1ª, is the preferred construction, the pivot-pins of the blocks 2 engaging opposite ends of said slot, the latter being enlarged midway between its ends at 1ᵇ to permit the head of the pivot-pins to be passed through the walls of the links. This construction permits the easy removal of a link or block in case of necessity. The lower edge of said links is made with rounded corners, as shown, and said links are separated as much as may be necessary to prevent the end of one link from striking the end of another when the chain is passing around a wheel of small diameter.

The wheel over which the chain runs is made with a groove 8 in its periphery, the sides 9 9 of which are inclined to the plane of rotation of said wheel. Preferably the degree of said inclination is not precisely the same as the inclination of the sides 6 of the links, but is such that when said links are applied to said groove, as shown in Fig. 1, the contact-point between them will be along the outer edge of the groove and along the line on the links of the chain formed by the meeting of the two planes of the side thereof—viz., the inclined and the vertical plane. The said wheel is preferably made of two pieces 10, of metal, riveted or otherwise secured rigidly together face to face and in cross-section, the shape of each plate being such that one half of said groove 8 will be formed in one of said plates and one half in the other, and a series of rivets 11 is located far enough below the point of contact of the chain-links with the sides of the groove to allow the latter to have a slight yielding action in a direction substantially at right angles to the plane of the inclined sides of the links. This movement is very slight; but as strain is put upon the chain the wedge-like form of the links will force said sides of the groove outward and permit the link to enter deeper into the groove and at the same time will bring the plane of the inclined sides of the groove into full bearing against the inclined sides of the links, causing the latter to be gripped tightly between the sides of the groove of said wheel.

While the manner of making the wheel and the chain as herein described is the preferred way of making them, the construction of a chain-wheel in two parts rather than in one and of a link of the chain from a blank, as described, is not material.

The wheel may be made of a single piece of metal with a groove 8 turned in its edge, and provided it has the characteristics of the wheel described it will be in all respects as good.

I am aware that drive-wheels adapted to receive a power-transmitting belt which is triangular in cross-section have been made heretofore and that pulleys adapted to receive said transmitting-belt have been made with separable sides, adjustable one toward or away from the other, to adapt the belt to a bearing between them at a greater or less distance from the axis of the pulley. This construction, however, is radically different from the yielding sides of a groove described as one of the characteristics of the drive-wheel of this application. In the aforesaid prior constructions the two sides of the wheel were separated manually and fixed in the desired position. In my construction the sides of the groove yield only to the separating power of a drive-chain, wedge-shaped in cross-section, which runs therein and which by reason of such yielding of the sides of the groove attains to a closer frictional engagement with said wheel.

Having thus described my invention, what I claim, and desire to secure by Letters Patent of the United States, is—

1. A drive-chain comprising a series of metal links formed from one piece of metal, and having two parallel sides between which one end of a block is supported, said sides below the block-receiving portion thereof converging toward each other and constituting bearing-surfaces adapted to enter a V-shaped groove in the periphery of a pulley for rotating the latter, combined with blocks pivotally uniting said links, substantially as described.

2. A drive-chain comprising a series of metal links and blocks alternately united end to end, said links being bent up to inclose each side of a block, and said links having converging sides, combined with a wheel having a V-shaped chain-receiving groove in its periphery, adapted to receive the converging sides of said links, substantially as described.

3. In a drive-chain, the combination of a series of metal links each made in one piece and having two parallel sides adapted to receive a metal block between them, pivot-pins in said blocks, and a slot in said parallel sides having an enlarged central portion whereby said pins may be withdrawn for removing a block; said links having converging bearing-surfaces constituting a prolongation of said parallel sides below the block-receiving portion of the latter, and metal blocks pivotally uniting said links, substantially as described.

4. A wheel having in its periphery a groove having sides outwardly yielding relative to the web of the wheel and inclined toward the axis thereof, and a drive-chain for said wheel adapted to frictionally engage said groove, substantially as described.

JOHN C. PRATT.

Witnesses:
WM. H. CHAPIN,
H. A. CHAPIN.